Feb. 6, 1962  K. W. SWAIN  3,020,370
PROTECTION OF SEMICONDUCTOR DIODES
Filed March 21, 1960  2 Sheets-Sheet 1

INVENTOR.
Kenneth W. Swain

Feb. 6, 1962      K. W. SWAIN      3,020,370
PROTECTION OF SEMICONDUCTOR DIODES
Filed March 21, 1960      2 Sheets-Sheet 2
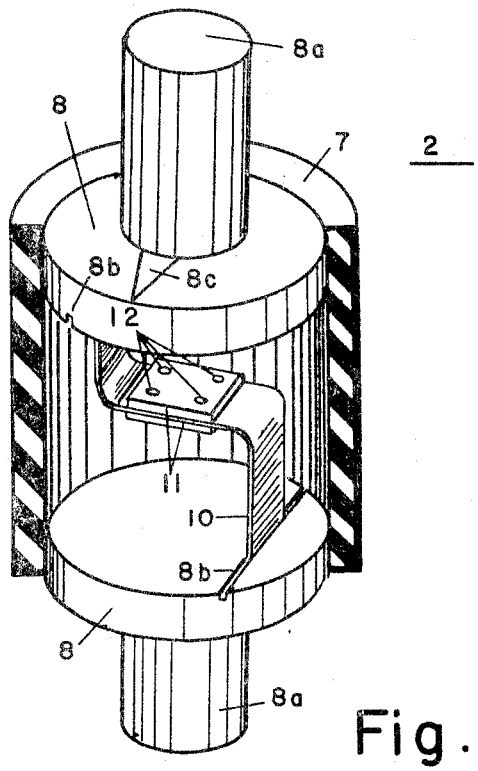
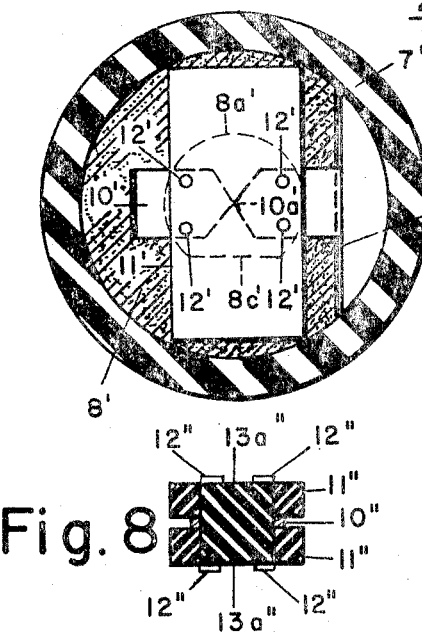
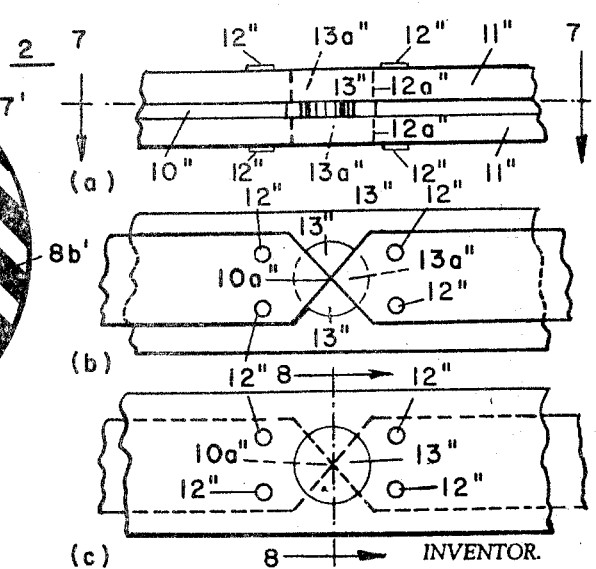
INVENTOR.
Kenneth W. Swain ns Patent Office 3,020,370
Patented Feb. 6, 1962

3,020,370
PROTECTION OF SEMICONDUCTOR DIODES
Kenneth W. Swain, Hampton Falls, N.H., assignor to
The Chase-Shawmut Company, Newburyport, Mass.
Filed Mar. 21, 1960, Ser. No. 16,340
15 Claims. (Cl. 200—120)

This invention is concerned with the protection of semiconductor diodes, and more particularly with the protection of high current density semiconductor diodes such as, for instance, silicon diodes.

From a more limited point of view this invention is concerned with current-limiting fuses for protecting high current density semiconductor diodes.

The basic concepts for protecting high current density semiconductor diodes by current-limiting fuses are disclosed and claimed in U.S. Patent 2,921,250 to K. W. Swain, Jan. 12, 1960, Coordinated Static Power Rectifiers and Current-Limiting Fuses, assigned to the same assignee as the present invention. The present invention is more particularly concerned with adapting current-limiting fuses for application in rotating semiconductor rectifiers wherein such fuses are subject to extreme stresses on account of the high centrifugal forces occurring in such rectifiers.

Rotating semiconductor rectifiers are well known in the art and, therefore, do not need to be described here in considerable detail. Rotating semiconductor rectifiers are being applied in electric rotating brushless machinery, and more particularly in A.-C. generators for energizing the rotating field winding thereof. Large aircraft A.-C. generators have generally a rotating field with D.-C. excitation furnished by an integral D.-C. exciter. The polyphase output of the armature can be rectified with cells, or semiconductor diodes, integral in the rotor, energized by polyphase rotor windings and providing the D.-C. current required for energizing the rotating field winding of the machine.

It is one object of this invention to provide current-limiting fuses capable of complying with the requirements of so-called cell fuses for the protection of high current density semiconductor rectifiers, and capable of withstanding the high centrifugal force occurring in rotating rectifiers of that kind.

Fuse links for cell fuses or fuses for the protection of high current density semiconductor diodes must have one or more points of drastically reduced cross-section, generally referred to as necks. The mechanical strength of these points of reduced cross-section or necks is very small and fuses of this character tend to break at their points of reduced cross-section or necks, even if applied in non-rotating rectifiers. In rotating rectifiers cell fuses must withstand centrifugal forces in the order of many thousand $g$ (acceleration of gravity), and thus the portions of reduced cross-section or necks of the links thereof have an increased tendency to break, thus making the particular fuse inoperative.

It is, therefore, another object of this invention to provide cell fuses which do not become damaged and do not become inoperative when rotated at high speeds.

The necks of fuse links of cell fuses intended to be applied in rotating semiconductor rectifiers must not only be able to withstand high centrifugal forces but, in addition thereto, must be protected against the action of external forces other than centrifugal forces having vectors whose direction is different from that of the vector of the centrifugal forces.

It is, therefore, another object of this invention to provide current-limiting fuses for semiconductor diode protection the necks of whose links are protected against the action of centrifugal forces as well as against the action of external forces other than centrifugal forces.

Another object of the invention is to provide current-limiting fuses for semiconductor diode protection the necks of whose links are protected against the action of centrifugal forces and against the action of external forces at right angles to the centrifugal forces.

Another object of the invention is to provide current-limiting fuses combining a relatively high current-carrying capacity and improved arc voltage characteristics or, to be more specific, wherein the initial arc voltage is relatively small and the arc voltage is relatively steady.

Another object of the invention is to provide current-limiting fuses having ribbon-type fuse links and having a relatively high current-carrying-capacity and comprising means for generating high effective arc-extinguishing blasts of gas.

These and other objects of the invention and advantages thereof will become more apparent from the accompanying drawings and the following description of preferred embodiments of the invention.

In the drawings:

FIG. 5 is an isometric view of the structure of FIGS. 3 and 4 upon removal of the arc-quenching filler therefrom;

FIG. 6 is a section similar to that shown in FIG. 4 of a modification of the structure of FIG. 4;

FIG. 7(a) is a side elevation of a fuse link which is sandwiched between a pair of insulating plates and intended to be combined with such structures as shown in FIGS. 3–5, inclusive;

FIG. 7(b) is a section along 7—7 of FIG. 7(a);

FIG. 7(c) is a top-plan view of the structure of FIGS. 7(a) and 7(b); and

FIG. 8 is a section along 8—8 of FIG. 7(c).

Figure 1:
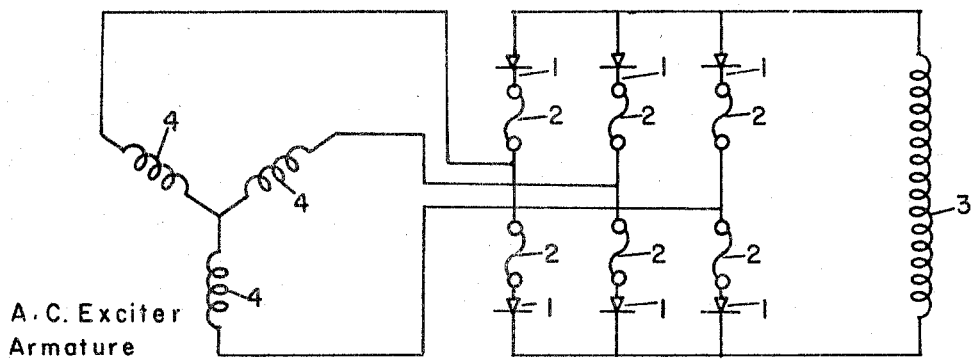
FIG. 1 is a wiring diagram of the rotor of an exciter for a brushless electric generator.
Figure 2:
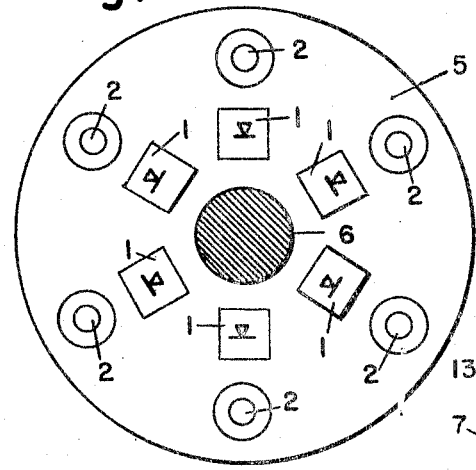
FIG. 2 shows diagrammatically the general lay-out of such a rotor.

Referring now to the drawings, and more particularly to FIGS. 1 and 2 thereof, the rotating field winding 3 is energized by the polyphase windings 4 of the exciter rotor by the intermediary of a semiconductor rectifier comprising six rotatable cells 1 and the rotatable cell fuses 2. As shown in FIG. 2 both the cells 1 and the cell fuses 2 are mounted on a supporting wheel 5 which, in turn, is mounted on the rotatable shaft 6. Supporting wheel 5 may be made of aluminum, and the six cells 1 may be bolted to a mounting flange thereof. Cells 1 may be restrained by a steel ring to withstand the centrifugal forces encountered when the shaft revolves at speeds in excess of 10,000 r.p.m.

As shown in FIGS. 3–6 each cell fuse 2 comprises a pair of terminal elements 8 in plug-form closing both ends of a tubular casing 7 of insulating material, e.g. a synthetic-resin-glass-cloth laminate. Connectors 8a substantially in the shape of cylindrical rods project from both outer ends of terminal plugs 8. Steel pins 9 project transversely through casing 7 into terminal plugs 8, thus establishing a firm connection between these two parts. The axially inner surfaces of terminal plugs 8 are provided with straight link-receiving grooves 8b. Each end of ribbon-type silver fuse link 10 is inserted into one of grooves 8b and soldered to one of the terminal plugs 8, thus conductively interconnecting the two terminal plugs 8. The central or axially inner portion of ribbon-type fuse link 10 is provided with a pair of lateral substantially V-shaped incisions which define a point of minimum cross-section or neck 10a. Ribbon type fuse link 10 is relatively thin and its neck 10a may have a width which is in the order of 1/30 of the width of the link. Consequently neck 10a tends to be very fragile. The axially inner portion of link 10 provided with neck 10a is sandwiched between a pair of plates 11 of relatively heat resistant insulating material. Four fasteners 12, e.g. eyelets, or rivets, project through both plates 11 and through fuse link 10. The neck 10a is so short and so narrow as to form substantially a point heat source when link 10 is carrying current. Ribbon-type fuse link 10 is preferably made of sheet silver because of the relatively high conductivity of that metal and its relatively small fusing energy. Fuse link 10 is preferably plated with a metal having a relatively low fusing point, e.g. tin. As more fully explained in the above referred-to U.S. Patent 2,921,250, the plating should be very thin, or critically thin, to reduce the fusing $\int i^2 \cdot dt$ of the point of reduced cross-section or neck 10a (when fusing in times less than .0166 sec.) to less than the fusing $\int i^2 \cdot dt$ required in the absence of the tin plating, or equivalent overlay. It will be apparent that fuse link 10 will be destroyed by a metallurgical reaction whenever the tin plating, or equivalent overlay, reaches its fusing point. If the temperature which must be reached at neck 10a to cause blowing of the fuse is relatively low, the demands upon plates 11 in regard to the heat resistance thereof can be kept to a minimum. Plates 11 of melamine-glass-cloth-laminates have been found to be sufficiently heat resistant to sandwich tin plated fuse links of silver.

Fuse link 10 and plates 11 are preferably submersed in a pulverulent arc-quenching filler 13 such as quartz sand.

Figure 3:
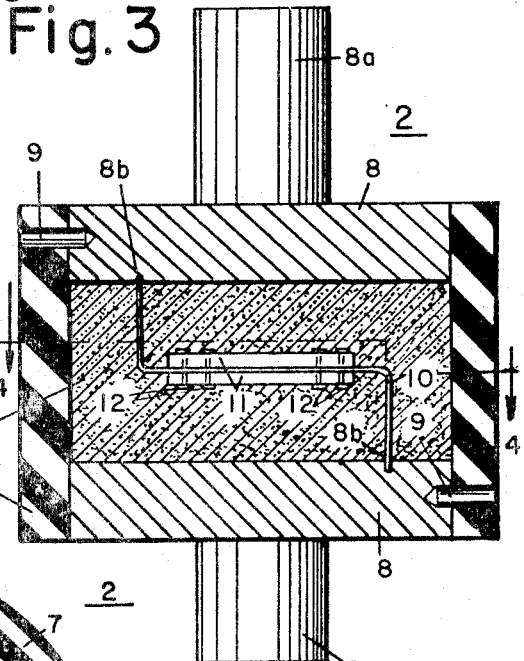
FIG. 3 is a section along 3—3 of FIG. 4 and shows a current-limiting fuse embodying this invention.
Figure 4:
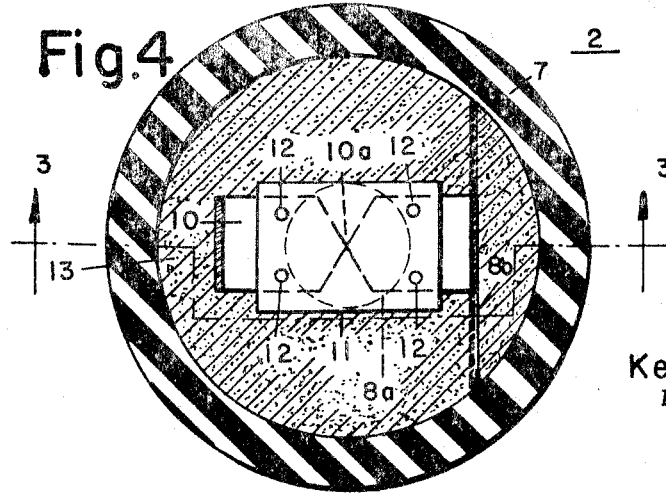
FIG. 4 shows the same structure as FIG. 3 and is a section along 4—4 of FIG. 3.

It will be apparent from FIGS. 3 to 5, inclusive, that the axially outer zones of fuse link 10 are angularly related to the axially inner zone of reduced cross-sectional area defining neck 10a. I have discovered that in fuse links of fuses to be mounted in rotating semiconductor rectifiers the narrow fragile necks are subjected mainly to two kinds of forces, namely axial forces, in addition to the centrifugal forces tending to shear neck 10a in the embodiment of the invention illustrated in FIGS. 3 to 5. The aforementioned angular relation of the axially inner zone of link 10 and the axially outer zones thereof provides protection for neck 10a against axial forces. If the entire fuse link were arranged in axial direction, as in conventional fuse design, axial forces tending to slightly narrow the spacing between terminal plugs 8 would impose compressive forces upon neck 10a which the latter is unable to withstand. The plate means 11 of insulating material which are coextensive with the axially inner zone of link 10 and are fastened to link 10 by the four fasteners 12 relieve the axially inner zone of link 10 from centrifugal forces incident to rotation of the fuse, tending to shear off the narrow neck 10a.

In order to achieve the above end fuse 2 ought to be mounted correctly in supporting wheel 5 (FIG. 2), i.e. in such a way that the line 3—3 of FIG. 4 is at right angles to a plane defined by the geometrical axis of shaft 6 and neck 10a. To this end, i.e. to achieve the right orientation of fuse 2 in supporting wheel 5, the upper plug 8 (FIG. 5) is provided with indicator means 8c indicating the position of the axially inner zone of link 10 relative to the cylindrical connectors 8a.

It will be apparent from FIGS. 3 to 5, inclusive, that the axially inner zone of reduced cross-sectional area defining neck 10a is arranged at a predetermined angle—namely at an angle of 90 degrees, or a right angle—relative to the longitudinal axis of casing 7. This angle must not necessarily be a right angle. Neck 10a might be protected against compressive forces by providing a fuse link whose axially outer portions which are not restricted in cross-section enclose an angle other than 90 degrees with the axially inner portion of the link which is restricted in cross-section, i.e. includes a neck, or point of narrowest cross-section.

The modification of the structure of FIGS. 3 to 5, inclusive, which is illustrated in FIG. 5 comprises a fuse link 10' which is arranged in a casing 7' in the same way as the fuse link 10 shown in FIGS. 3 to 5, inclusive, is arranged in casing 7. As shown in FIG. 6 the right bent end of fuse link 10' is inserted in a groove 8b' provided in a plug 8' closing the lower end of casing 7'. Casing 7' is closed on the upper end by a terminal plug (not shown) into a groove of which the left upper end of link 10' is inserted. The neck 10a' of link 10' and the portions of link 10' adjacent to neck 10a' are associated with plate means 11'—e.g. sandwiched between a pair of plates—which are secured to link 10' by means of four eyelets or rivets 12' or like fasteners. The terminal plugs closing casing 7' are provided with cylindrical connectors in the same fashion as shown in FIGS. 3 to 5, inclusive, and described in connection therewith. FIG. 6 illustrates only the lower substantially cylindrical connector 8a'. The latter is provided with a flat portion 8c' having a predetermined relation to the position of the axially inner zone of fuse link 10' which includes neck 10a'. The flat portion 8c' of connector 8a' is intended to abut against a similar surface (not shown) in supporting wheel 5 (FIG. 2) and thus to properly orient the fuse structure 2' in regard to shaft 6. Plate means 11' bridging the axially inner zone of fuse link 10' include portions—namely four corners—in abutting relation with the inner surface of casing 7'. Thus plate means 11' cannot move inside casing 7' at right angles to the longitudinal axis thereof and, therefore, the axially inner portion of fuse link 10' is likewise positively prevented from moving inside of casing 10' at right angles to the longitudinal axis thereof.

Referring now to FIGS. 7(a), 7(b), 7(c) and 8, the structure shown therein comprises a tin plated fuse link 10'' of silver having a pair of lateral V-shaped incisions defining a neck 10a''. Neck 10a'' forms a point-heat-source when link 10'' is carrying current. The above mentioned incisions are filled by a body of thermoplastic insulating material, e.g., an epoxy resin. This body is formed by two sectors 13'' each filling one of the V-shaped incisions in link 10'' and each having the same thickness as link 10''. A pair of plates 11' of insulating material sandwiches the link 10'' and the body 13'' of a thermoplastic insulating material. Plates 11'' are relatively heat resistant. They may be made of a suitable laminate of synthetic resin and fiber glass cloth, e.g. a melamine laminate. Plates 11'' have openings 12a'' therein which are substantially in registry with neck 10a'' or point of minimum cross-section of link 10''. The body 13'' of a thermoplastic insulating material has transverse projections 13a'' extending from the neck zone into openings 12a'' of plates 11'' and completely plugging said openings. The surface or area of circular holes 12a'' is substantially larger than the surface of neck 10a'', and the surface or area of circular openings 12a'' is coextensive with neck 10a'' and with a portion of the two V-shaped lateral incisions in link 10'' by which neck 10a'' is defined. The cover plates 11'' sandwiching link 10'' are secured to link 10'' by means of four fasteners 12'' projecting transversely through link 10'' and through plates 11''. Plates 11'' extend in a direction longitudinally of the middle portion of link 10'' and may engage with the four corners thereof (not shown) the inner surface of a casing in a way similar to that shown in FIG. 6 and described in connection therewith. The arrangement of parts shown in FIGS. 7(a) to 7(c) and 8 may be submersed in a pulverulent arc-quenching filler as that shown in FIG. 6.

The operation of the fuse structure shown in the above figures is as follows:

On occurrence of a dangerous overcurrent a break is formed at the neck 10a''. Hence an arc is kindled at this point. The arc causes partial fusion and partial vaporization of the thermoplastic insulating body 13'' causing, in turn, formation of a bubble in which the arc burns. Vapors ejected from the boiling bubble walls into the arc path tend to raise the arc voltage of the bubble enclosed arc. The mechanical strength of the thermoplastic body 13″ is less in a direction at right angles to the planes of plates 11″ than in all directions inside the plane of the central portion of link 10″ adjacent neck 10a″. This is not apparent from the drawing because the thickness of plates 11″ has been exaggerated therein. Actually, the thickness of plates 11″ is considerably less than the diameter of openings 12a″ and under such circumstances the mechanical strength of thermoplastic insulating body 13″ is less in a direction at right angles to the planes of plates 11″ than in all directions inside the plane of the central portion of link 10″ adjacent neck 10a″. When the pressure inside of the arc-enclosing bubble is sufficiently high the thermoplastic insulating body 13″ will burst and the products of arcing allowed to escape. Bursting occurs in the direction in which the mechanical strength of body 13″ is smallest, i.e. in a direction at right angles to the planes of plates 11″. The mechanism of circuit interruption of the structure of FIGS. 7(a)–7(c) and 8 is thus, in essence, the same as that of the interrupting device disclosed and claimed in United States Patent 2,895,031 to F. J. Kozacka, July 14, 1959, Fusible Protective Devices, assigned to the same assignee as the present invention, but the device of the above figures is adapted to carry much higher currents than the device described and claimed in the aforementioned patent.

It will be understood that the arrangement of parts shown in FIGS. 7(a) to 7(c) and FIG. 8 is not limited to rotating semiconductor rectifiers but can be used in all instances where the aforementioned mechanism of generation of arc voltage and of arc-quenching appears to be indicated. This mechanism is particularly desirable because it permits to keep the initial arc voltage relatively small and to maintain the arc voltage relatively steady throughout the arcing time.

Having disclosed several preferred embodiments of my invention it is desired that the same not be limited to the particular structures disclosed. It will be obvious to any person skilled in the art that many modifications and changes may be made without departing from the broad spirit and scope of my invention. Therefore it is desired that the invention be interpreted as broadly as possible and limited only as required by the prior state of the art.

I claim as my invention:

1. A current-limiting fuse for rotating rectifiers comprising a tubular casing of insulating material; a pair of terminal elements closing the ends of said casing; a ribbon-type fuse link conductively interconnecting said pair of terminal elements, said link including an axially inner zone of reduced cross-sectional area and axially outer zones enclosing angles of about 90 degrees with said axially inner zone; and plate means of insulating material substantially coextensive with said axially inner zone fastened to said link and bridging said axially inner zone to relieve said axially inner zone from centrifugal forces incident to rotation of said fuse.

2. A current-limiting fuse as specified in claim 1 comprising a pair of cylindrical connectors each projecting from one of said pair of terminal elements, and indicator means indicating the position of said axially inner zone of said link relative to said pair of connectors.

3. A current-limiting fuse as specified in claim 1 comprising a pair of substantially cylindrical connectors each projecting from one of said pair of terminal elements, and a flat portion on at least one of said pair of connectors having a predetermined relation to the position of said axially inner zone of said link.

4. A current-limiting fuse for rotating rectifiers comprising a tubular casing of insulating material; a pair of terminal plugs closing the ends of said casing; a ribbon-type fuse link of silver conductively interconnecting said pair of plugs, said link including an axially inner zone of reduced cross-sectional area and axially outer zones enclosing angles of about 90 degrees with said axially inner zone; and a pair of plates of insulating material coextensive with said axially inner zone sandwiching and bridging said axially inner zone and being fastened to said link.

5. A fuse for rotating rectifiers comprising a tubular casing of insulating material; a pair of terminal elements closing the ends of said casing; a ribbon-type fuse link conductively interconnecting said pair of terminal elements, said fuse link including a zone of reduced cross-sectional area arranged substantially at right angles to the longitudinal axis of said casing; and plate means of insulating material arranged at right angles to said longitudinal axis of said casing fastened to said fuse link and bridging said zone of reduced cross-sectional area to relieve said zone of reduced cross-sectional area from centrifugal forces incident to rotation of said fuse.

6. A fuse for rotating rectifiers comprising a tubular casing of insulating material; a pair of terminal elements closing the ends of said casing; a ribbon-type fuse link of silver conductively interconnecting said pair of terminal elements, said fuse link including a zone of reduced cross-sectional area arranged substantially at right angles to the longitudinal axis of said casing; and plate means of insulating material arranged substantially at right angles to said longitudinal axis of said casing fastened to said link and bridging said zone of reduced cross-sectional area to relieve said zone of reduced cross-sectional area from centrifugal forces incident to rotation of said fuse.

7. A fuse for rotating rectifiers comprising a tubular casing of insulating material; a pair of terminal plugs closing the ends of said casing and having grooves on the axially inner surfaces thereof; a ribbon-type fuse link conductively interconnecting said pair of plugs, said link including axially outer ends inserted into said grooves and said link further including a zone of reduced cross-sectional area arranged substantially at right angles to the longitudinal axis of said casing; and a pair of plates of insulating material arranged substantially at right angles to said longitudinal axis of said casing fastened to said link and bridging said zone of reduced cross-sectional area to relieve said zone of reduced cross-sectional area from centrifugal forces incident to rotation of said fuse.

8. A fuse for rotating rectifiers comprising a tubular casing of insulating material; a pair of terminal plugs closing the ends of said casing and having grooves on the axially inner surfaces thereof; a ribbon-type fuse link of silver conductively interconnecting said pair of plugs, said link including axially outer ends inserted into said grooves and said link further including a zone of reduced cross-sectional area arranged substantially at right angles to the longitudinal axis of said casing; and a pair of plates of insulating material arranged substantially at right angles to said longitudinal axis of said casing and sandwiching said zone of reduced cross-sectional area, said pair of plates being fastened to said link and bridging said zone of reduced cross-sectional area to relieve said zone of reduced cross-sectional area from centrifugal forces incident to rotation of said fuse.

9. A current-limiting fuse for rotating rectifiers comprising a tubular casing of insulating material; a pair of terminal plugs closing the ends of said casing and having grooves on the axially inner surfaces thereof; a ribbon-type fuse link of silver conductively interconnecting said pair of plugs, said link including axially outer ends inserted into said grooves and said link further including an axially inner zone of reduced cross-sectional area enclosing angles of about 90 degrees with said axially outer ends, said axially inner zone having a pair of lateral substantially V-shaped incisions defining substantially a point-heat-source when said link is carrying current, a pair of plates of insulating material substantially coextensive with said axially inner zone sandwiching and bridging said axially inner zone; and two pairs of fasteners each arranged on opposite sides of said pair of incisions and projecting transversely through said link and through said pair of plates.

10. A current-limiting fuse for rotating rectifiers comprising a tubular casing of insulating material; a pair of terminal elements closing the ends of said casing; a ribbon-type fuse link conductively interconnecting said pair of terminal elements, said link including an axially inner zone of reduced cross-sectional area and axially outer zones enclosing angles of about 90 degrees with said axially inner zone; plate means of insulating material coextensive with said axially inner zone fastened to said link and bridging said axially inner zone; and said plate means including portions in abutting relation with the inner surface of said casing.

11. A current-limiting fuse for rotating rectifiers comprising a tubular casing of insulating material; a pair of terminal plugs closing the ends of said casing; a ribbon-type fuse link of silver conductively interconnecting said pair of plugs, said link including a zone of reduced cross-sectional area arranged substantially at right angles to the longitudinal axis of said casing; a pair of plates of insulating material arranged substantially at right angles to said longitudinal axis of said casing and sandwiching said zone of reduced cross-sectional area, said pair of plates being fastened to said link and bridging said zone of reduced cross-sectional area to impart increased mechanical strength to said link, and said pair of plates including corners engaging the inner surface of said casing.

12. A current-limiting fuse for rotating rectifiers comprising a tubular casing of insulating material; a pair of terminal elements closing the ends of said casing; a ribbon-type fuse link conductively interconnecting said pair of terminal elements, said link including an axially inner zone having a point of minimum cross-sectional area and axially outer wider zones enclosing angles of about 90 degrees with said axially inner zone; a body of a thermoplastic insulating material having the same thickness as said link surrounding said point of minimum cross-sectional area thereof; a pair of plates of insulating material sandwiching said link and said body, said pair of plates having openings therein substantially in registry with and having a larger area than said point of minimum cross-sectional area; said body having transverse projections extending into said pair of openings and plugging said pair of openings.

13. A current-limiting fuse comprising a ribbon-type fuse link having a point of reduced cross-section, a body of a thermoplastic insulating material having the same thickness as said link surrounding said point of reduced cross-section thereof, a pair of plates of insulating material sandwiching said link and said body, said pair of plates having openings therein substantially in registry with and having a larger area than said point of reduced cross-section of said link, and said body having a pair of transverse projections extending into said pair of openings and plugging said pair of openings.

14. A current-limiting fuse comprising a ribbon-type fuse link having a point of reduced cross-sectional area sufficiently short and narrow to approximate a point-heat-source when said link is carrying current; a pair of plates of insulating material sandwiching said point, each of said pair of plates having an opening in substantial registry with said point substantially larger than the surface of said point, and a pair of bodies of a thermoplastic insulating material plugging said opening in each of said pair of plates and filling the space between said pair of plates adjacent said point of reduced cross-sectional area of said link.

15. A current-limiting fuse comprising a ribbon-type fuse link having a pair of substantially V-shaped lateral incisions defining a point of reduced cross-sectional area forming substantially a point-heat-source when said link is carrying current, a pair of plates of insulating material sandwiching said link at said point thereof, each of each pair of plates having an opening coextensive with said point and with a portion of said incisions, and a pair of bodies of a thermoplastic insulating material filling the portions of said incisions coextensive with said opening in each of said pair of plates and plugging said opening in each of said pair of plates.

References Cited in the file of this patent

UNITED STATES PATENTS

| | | |
|---|---|---|
| 2,794,099 | Swain | May 28, 1957 |
| 2,852,641 | Valentine | Sept. 16, 1958 |
| 2,866,038 | Kozacka | Dec. 23, 1958 |
| 2,892,061 | Kozacka | June 23, 1959 |
| 2,895,031 | Kozacka | July 14, 1959 |